United States Patent
Sumiya et al.

(10) Patent No.: US 12,432,062 B2
(45) Date of Patent: Sep. 30, 2025

(54) ELECTRONIC CONTROL DEVICE WITH SECURE RESUMPTION OF INTERRUPTED WRITE PROCESSING

(71) Applicant: HITACHI ASTEMO, LTD., Hitachinaka (JP)

(72) Inventors: Kosuke Sumiya, Hitachinaka (JP); Shun Kinugasa, Hitachinaka (JP); Yusuke Abe, Hitachinaka (JP); Atsushi Hironaka, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 186 days.

(21) Appl. No.: 18/254,457

(22) PCT Filed: Aug. 31, 2021

(86) PCT No.: PCT/JP2021/031847
§ 371 (c)(1),
(2) Date: May 25, 2023

(87) PCT Pub. No.: WO2022/130699
PCT Pub. Date: Jun. 23, 2022

(65) Prior Publication Data
US 2024/0015013 A1    Jan. 11, 2024

(30) Foreign Application Priority Data
Dec. 16, 2020    (JP) .................................. 2020-208372

(51) Int. Cl.
*H04L 9/32*    (2006.01)
*G06F 8/65*    (2018.01)

(52) U.S. Cl.
CPC . *H04L 9/32* (2013.01); *G06F 8/65* (2013.01)

(58) Field of Classification Search
CPC ..................................... H04L 9/32; G06F 8/65
See application file for complete search history.

(56) References Cited

U.S. PATENT DOCUMENTS

| | | | |
|---|---|---|---|
| 11,021,167 B2* | 6/2021 | Yokota | G05B 13/026 |
| 11,175,906 B2* | 11/2021 | Jeong | G06F 8/66 |
| 2017/0331795 A1* | 11/2017 | Martin | H04L 9/0861 |
| 2019/0034192 A1* | 1/2019 | Fox | G06F 8/656 |
| 2020/0034134 A1* | 1/2020 | Jayaraman | H04W 4/02 |
| 2020/0114927 A1* | 4/2020 | Yokota | G06F 8/65 |
| 2021/0403016 A1* | 12/2021 | Jung | G06F 8/65 |

FOREIGN PATENT DOCUMENTS

| | | |
|---|---|---|
| JP | 2017-097576 A1 | 6/2017 |

OTHER PUBLICATIONS

International Search Report with English Translation and Written Opinion of International Patent Application No. PCT/JP2021/031847 dated Nov. 22, 2021 (9 pages).

* cited by examiner

*Primary Examiner* — Mohamed A. Wasel
(74) *Attorney, Agent, or Firm* — Foley & Lardner LLP

(57) ABSTRACT

An electronic control device according to the present invention for resuming an interrupted encrypted writing process, wherein a first data block included in the updated data is encrypted by using a second data block, and when the writing processing for writing the first data block to the storage unit is interrupted while in progress, updated data which includes both the first data block and the second data block is reacquired, after which the first data block is decoded again by using the reacquired second data block.

13 Claims, 9 Drawing Sheets

ELECTRONIC CONTROL DEVICE WITH SECURE RESUMPTION OF INTERRUPTED WRITE PROCESSING

TECHNICAL FIELD

The present invention relates to an electronic control device mounted on a vehicle.

BACKGROUND ART

An in-vehicle electronic control device such as an electrical control unit (ECU) is controlled by a microcomputer. Various functions are assigned to the microcomputer, and external circuits corresponding thereto are provided. The ECU controls the target device by executing control software stored in a flash read only memory (ROM) which is a nonvolatile memory. In an automobile, for example, fuel injection and ignition of an engine are controlled.

The ECU generally has means for rewriting control software written in a memory mounted on the ECU. For example, there are the following means: (1) a system in which a diagnosis tool is connected to an ECU in a wired manner via an on-board diagnostic (OBD) connector, and data to be written in a flash ROM is transmitted by a signal of a controller area network (CAN) or the like (conventional system); and (2) a system for transmitting update version data to an ECU through over-the-air (OTA) wireless communication.

In the software rewriting by the OTA, the update version data may be received while the vehicle is traveling. In this method, it is necessary to transfer data little by little in the background so as not to affect other control being executed. At this time, the software rewriting time becomes long, and the process may be interrupted due to a factor such as power supply being cut off by the user, for example. In such a case, a resume function that starts from the middle even if the software rewriting is interrupted is required.

The following PTL 1 describes a resume function of software rewriting. In this literature, a software rewriting start address is requested from a data transfer source to an ECU after interruption of software rewriting.

CITATION LIST

Patent Literature

PTL 1: JP 2017-097576 A

SUMMARY OF INVENTION

Technical Problem

In the software rewriting of the ECU, communication is performed between a data transfer source such as a diagnostic tool and the rewriting target ECU. In particular, in the OTA system, since data is transferred using wireless communication, the importance of encrypting the transfer data is increasing from the viewpoint of security.

When the software rewriting using the unencrypted data is resumed, the software rewriting may be resumed from the data position where the software rewriting is completed as in PTL 1. Therefore, after the interruption, the next address of the rewriting completed position may be returned as the start address to the restart position inquiry message from the data transfer source.

On the other hand, when the update version data is encrypted, the transmission data is divided into several data blocks, encrypted for each data block, and sequentially transmitted to the ECU for each data block. On the ECU side that has received the data, another piece of information (for example, the immediately preceding encrypted data block of the transfer start data block) is required for the decryption processing. Then, the ECU side cannot decrypt the encrypted data block only by notifying the data address to be retransmitted as in PTL 1.

The present invention has been made in view of the above problems, and an object of the present invention is to provide a technique capable of appropriately restarting write processing when the write processing is interrupted in the middle even when update version data to be written to an ECU is encrypted.

Solution to Problem

In the electronic control device according to the present invention, a first data block included in update data is encrypted by using a second data block, and when write processing of writing the first data block in the storage unit is interrupted in the middle, the update data including both the first data block and the second data block is re-acquired, and then the first data block is re-decrypted by using the re-acquired second data block.

Advantageous Effects of Invention

According to the electronic control device of the present invention, it is possible to appropriately resume write processing when the write processing is interrupted in the middle even when update version data to be written to an ECU is encrypted.

DESCRIPTION OF EMBODIMENTS

First Embodiment

Figure 1:
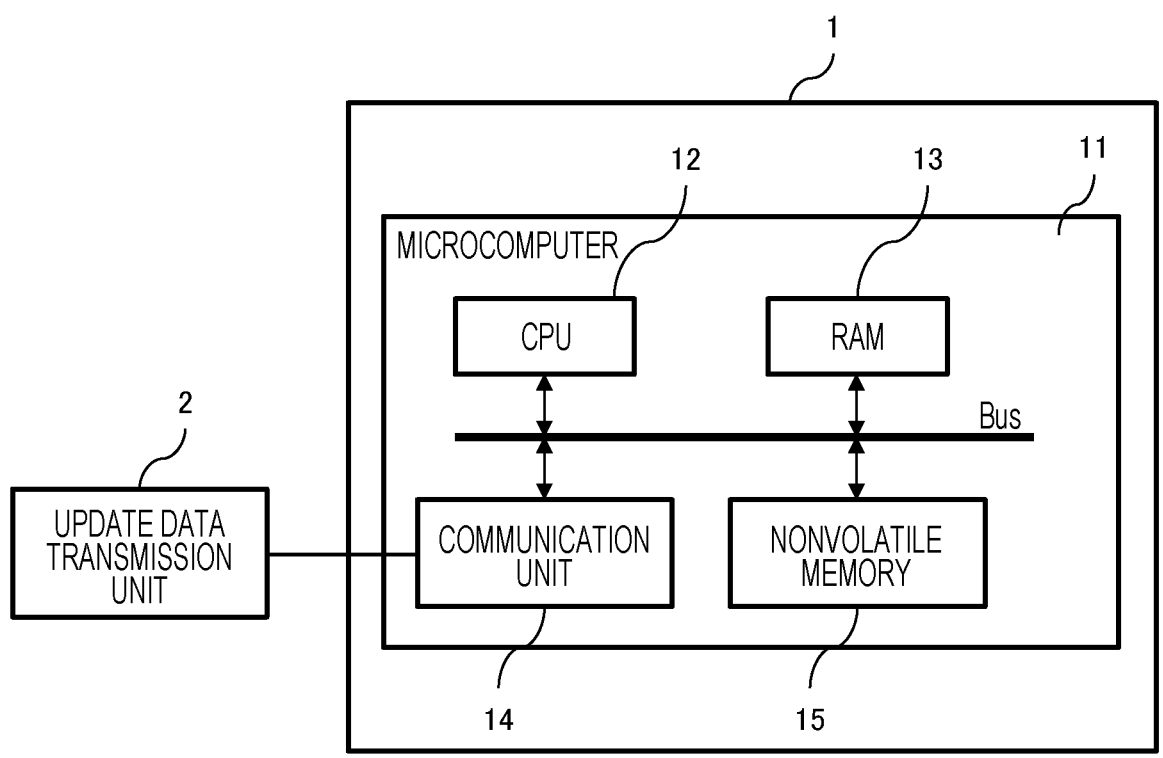
FIG. 1 is a configuration diagram of an electronic control device (ECU) 1 according to a first embodiment.

FIG. 1 is a configuration diagram of an electronic control device (ECU) 1 according to a first embodiment of the present invention. The ECU 1 is mounted on a vehicle. The ECU 1 controls devices mounted on the vehicle. Examples of the in-vehicle device include an engine, a power steering device, a control brake device, and the like. The ECU 1 controls the in-vehicle devices by executing a control program in which a process of controlling the in-vehicle devices is mounted.

The ECU 1 includes a microcomputer 11. The microcomputer 11 includes at least one central processor unit (CPU) 12 that executes software, at least one volatile random access memory (RAM) 13, at least one nonvolatile memory 15 that holds programs and data, and at least one communication unit 14. The communication unit 14 is connected to an update data transmission unit 2 outside the ECU 1, and receives update data via the update data transmission unit 2 at the time of program update.

The update data transmission unit 2 may be, for example, a terminal for program update preferentially connected to a data communication connector of a vehicle, or may be a server computer that communicates with the ECU 1 by wireless communication. Alternatively, another ECU mounted on the same vehicle may be used.

Figure 2:
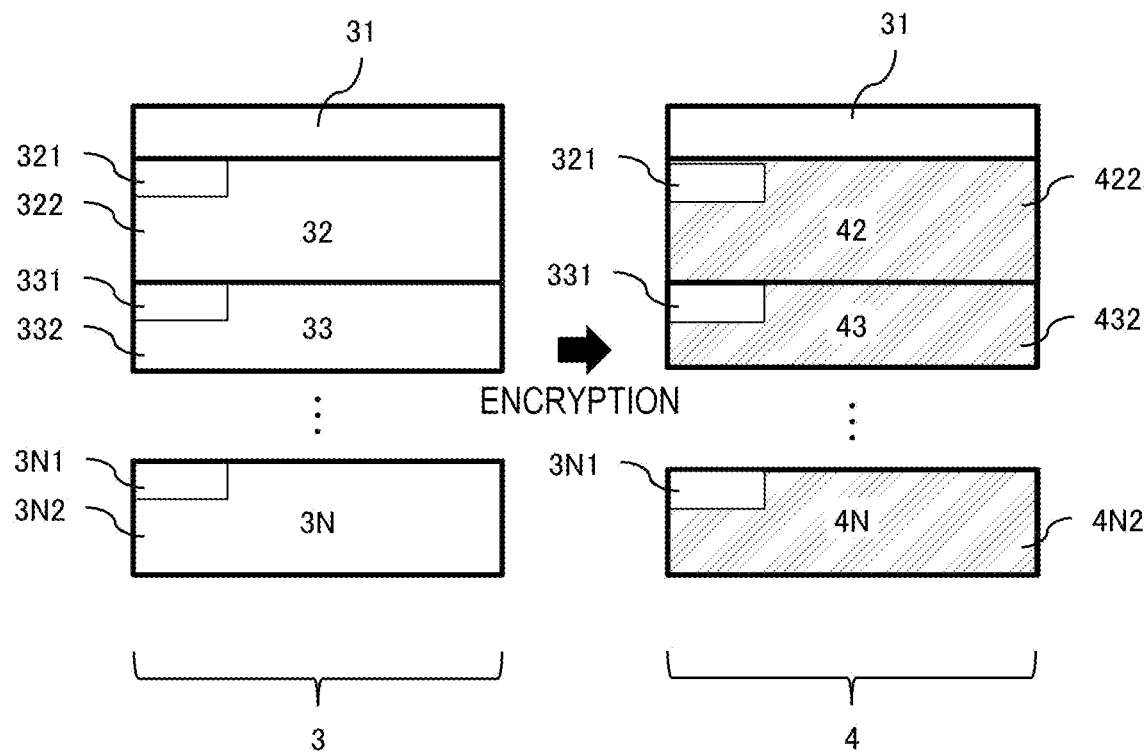
FIG. 2 is a schematic diagram illustrating a state in which update data 3 is encrypted.

FIG. 2 is a schematic diagram illustrating a state in which update data 3 is encrypted. The update data 3 is data including an update version of a program or the like executed by the ECU 1. The update data 3 is transmitted from a data center or the like to the ECU 1 by wireless communication, for example. The update data 3 is configured as, for example, binary data itself stored in the nonvolatile memory 15.

The update data 3 includes a global header 31 and one or more data blocks (FIG. 2 illustrates data blocks 32, 33, and 3N). The data block includes a local header portion and a body portion (for example, the data block 32 includes a local header 321 and a body 322). The size of each data block may be the same or different.

The body portion of the data block is compressed before being transmitted to the ECU 1. The local header portion is not compressed. A local header is given to the compressed body portion. The update data 3 is created by concatenating a pair of a local header and a body to form one piece of data and further adding the global header 31. The local header describes supplementary information of the data block, and the global header describes supplementary information of the entire update data 3. Details of these headers will be described later.

The update data 3 is encrypted before being transmitted to the ECU 1 and becomes update data 4. The update data 4 includes an encrypted data block (FIG. 2 illustrates data blocks 42, 43, and 4N). The global header 31 is assigned as it is without being encrypted. Although block encryption is used as the encryption algorithm in the present embodiment, another algorithm may be used. When the block encryption algorithm is used, the update data 4 is encrypted for each data block, and then encrypted for each block of a certain size.

The local header may or may not be encrypted. That is, as described later, it is sufficient that a correspondence between each data block in the update data 4 and a storage address of each data block on the nonvolatile memory 15 can be specified. In other words, this correspondence may be described in the global header 31 or may be described in each local header. In the former case, by describing the start address of each data block in the update data 4 in the global header 31, the ECU 1 can specify the correspondence between each data block in the update data 4 and the storage destination address in the nonvolatile memory 15, and thus, may encrypt each local header. In the latter case, each local header describes the location of the next local header in the update data 4, and by continuing this, the location of each data block in the update data 4 is determined. The local header of a data block describes information that can specify a location (address) in the nonvolatile memory 15 where the data block is to be stored. As a result, the ECU 1 can specify the correspondence between each data block in the update data 4 and the storage destination address in the nonvolatile memory 15. In either case, the global header 31 is not encrypted.

The local header is not necessarily disposed at the head of the data block, and may be disposed at the end of the data block, for example, or may be disposed at an arbitrary position between the head and the end. As a method in which the local header specifies the position of the next data block, the head of the body of the next data block may be specified, or the local header of the next data block (only when the local header is disposed at the head of the data block) may be specified.

Figure 3:
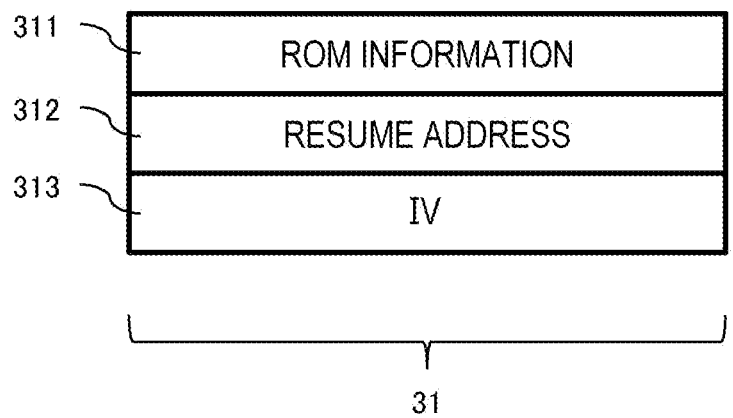
FIG. 3 is a configuration diagram of a global header 31.

FIG. 3 is a configuration diagram of the global header 31. The global header 31 includes ROM information 311, a resume address 312, and an initial vector (IV) 313. Here, an example in which the relationship between the data block and the storage destination address in the nonvolatile memory 15 (that is, the resume address 312) is stored in the global header 31 has been described.

The ROM information 311 is information such as the number of blocks constituting the update data 3, the size of the update data 3, and a code indicating a compression/encryption algorithm. The resume address 312 describes a correspondence between a head address of each data block in the update data 3 and an address at which the data block in the nonvolatile memory 15 is written. The address itself in the nonvolatile memory 15 may be described, or other information that can specify the address in the nonvolatile memory 15 may be described. The IV 313 is information necessary for decrypting the first encrypted data block (the data block 42 in FIG. 2) in the block encryption. The ROM information 311 and the resume address 312 may be included in the local header. The IV 313 may not be included in the global header 31 and may be stored in the nonvolatile memory 15 in advance.

As the address in the update data 3 described by the global header 31, the same value is used in the update data 4 (since the global header 31 is common between the update data 3 and 4). Therefore, when the update data 3 is encrypted, it is desirable not to change the size of each data block. For example, it is desirable to use an encryption algorithm that does not change the size of the data block. Block encryption is one example. On the other hand, when the update data 3 is encrypted, in a case where the size of each data block changes, it is necessary to reflect the change on the resume address 312.

A part or all of each piece of information in the global header 31 is transmitted to the ECU 1 via the update data transmission unit 2 and then stored in the nonvolatile memory 15. In the present embodiment, when the ECU 1 receives the update data 4, the resume address 312 is stored in the nonvolatile memory 15, and other information in the global header 31 is not stored, but instead of or in addition to this, for example, the IV 313 may be stored in the nonvolatile memory 15.

Figure 4:
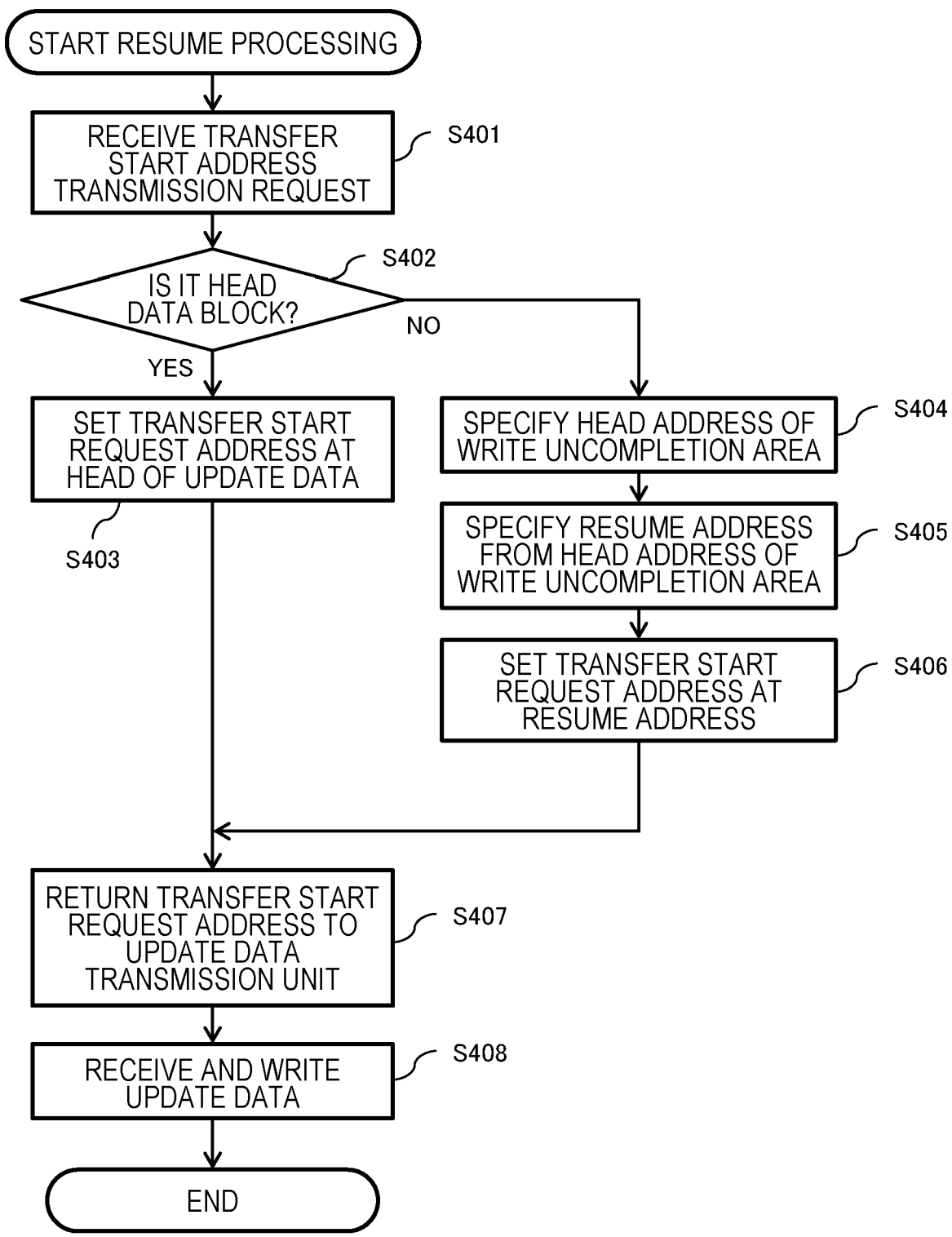
FIG. 4 is a flowchart for explaining resume processing in program update.

FIG. 4 is a flowchart for explaining resume processing in program update. Each step of FIG. 4 will be described below.

(FIG. 4: Step S401)

When the resume processing is started, the update data transmission unit 2 requests the ECU 1 to transmit a transfer start address of the update data 4. The transfer start address is an address that designates from which part of the update data 4 is to be retransmitted to the ECU 1, for example, when the process of writing the update data 4 to the nonvolatile memory 15 is interrupted in the middle. When the processing is not interrupted in the middle, the head address may be designated.

(FIG. 4: Step S402)

The CPU 12 determines whether a data block to be first written to the nonvolatile memory 15 is a head data block of the update data 4. This determination can be performed by referring to write completion block information described later. When the head data block is to be written, the process proceeds to S403, and when the data block other than the head data block is to be written, the process proceeds to S404.

(FIG. 4: Steps S403, S407)

The CPU 12 sets a transfer start request address at the head of the update data 4 (S403). The CPU 12 returns the transfer start request address to the update data transmission unit 2 (S407).

(FIG. 4: Steps S404 to S406, S407)

The CPU 12 specifies the head address of the area in which the writing of the data block in the nonvolatile memory 15 is not completed according to the write completion block information (S404). The CPU 12 specifies the corresponding address in the update data 4 according to the specified address (S405). This address is a resume address of the update data 4. The correspondence between the address in the nonvolatile memory 15 and the address in the update data 4 may be stored in the nonvolatile memory 15 in advance, for example. Alternatively, the correspondence may be held in advance in the update data transmission unit 2, and the CPU 12 may specify the address in the nonvolatile memory 15 as the resume address and specify the corresponding address in the update data 4 according to the correspondence in the update data transmission unit 2. The CPU 12 sets the resume address as the transfer start request address (S406). The CPU 12 returns the transfer start request address to the update data transmission unit 2 (S407).

(FIG. 4: Step S405: Supplement)

The position of the data block in the update data 4 may be specified by an address in the update data 4, or may be specified by information other than the address, such as a number of the data block. That is, at least information that can specify a correspondence between a data block in the update data 4 and a position in the nonvolatile memory 15 may be shared between the update data transmission unit 2 and the ECU 1.

(FIG. 4: Step S408)

When receiving the transfer start request address from the ECU 1, the update data transmission unit 2 transmits a portion of the update data 4 after the transfer start request address to the ECU 1. The CPU 12 receives the update data 4 and writes the update data in the nonvolatile memory 15. Details of this step will be described later.

Figure 5:
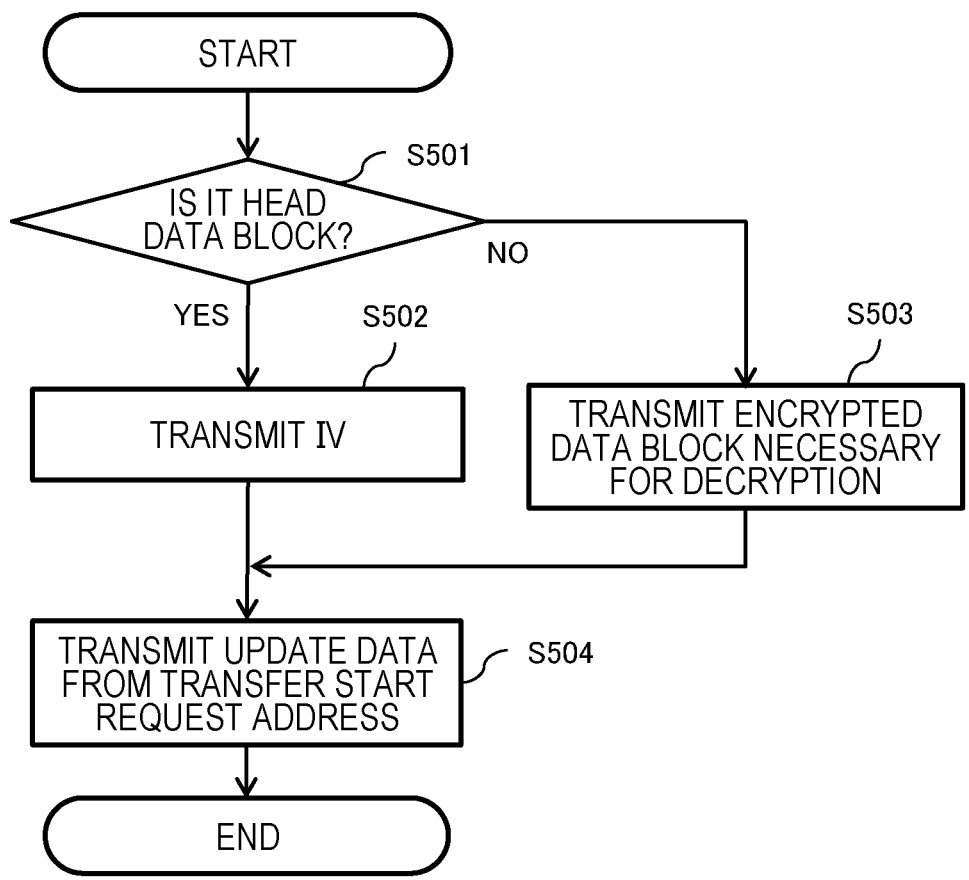
FIG. 5 is a flowchart for explaining a process in which an update data transmission unit 2 transmits update data 4.

FIG. 5 is a flowchart for explaining a process in which the update data transmission unit 2 transmits the update data 4. When receiving the transfer start request address from the ECU 1, the update data transmission unit 2 starts this flowchart. Each step of FIG. 5 will be described below.

(FIG. 5: Step S501)

The update data transmission unit 2 determines whether the transfer start request address is an encrypted data block of the head of the update data 4. If it is the head, the process proceeds to S502, and if it is not the head, the process proceeds to S503.

(FIG. 5: Step S502)

The update data transmission unit 2 transmits the IV 313 used to decrypt the encrypted data block of the head of the update data 4 to the ECU 1.

(FIG. 5: Step S503)

The update data transmission unit 2 transmits another encrypted data block used for decrypting the data block of the update data 4 to the ECU 1. Typically, when a data block is encrypted, encryption is performed using a previous encrypted data block. Therefore, the update data transmission unit 2 transmits the encrypted data block immediately before the data block designated by the transfer start request address to the ECU 1.

(FIG. 5: Step S504)

The update data transmission unit 2 sequentially transmits data blocks designated by the transfer start request address to the ECU 1. The ECU 1 can decrypt the data block received first by using the data block received in S502 or S503. For subsequent data blocks, the previously received data block is temporarily stored in the RAM 13 or the like, and decryption can be performed using the data block. When a data block other than the previously received data block is used in decryption, the data block used for decryption may be temporarily stored in the RAM 13 or the like.

Figure 6:
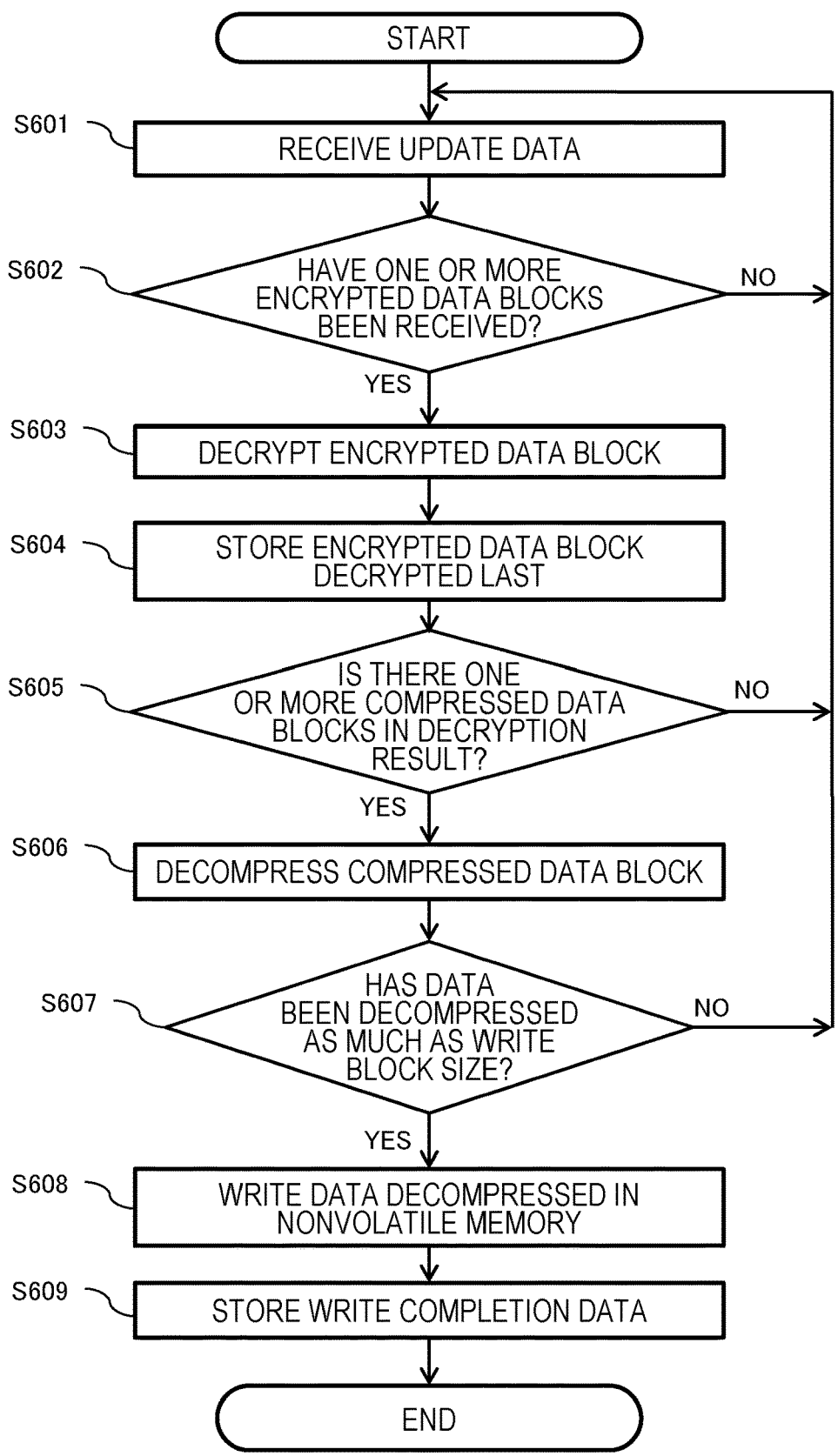
FIG. 6 is a flowchart for explaining details of S408.

FIG. 6 is a flowchart for explaining details of S408. Hereinafter, each step of FIG. 6 will be described.

(FIG. 6: Step S601)

The communication unit 14 receives the update data 4 from the update data transmission unit 2. The CPU 12 stores the global header 31 (ROM information 311, resume address 312, IV 313) included in the update data 4 in the RAM 13 or the nonvolatile memory 15.

(FIG. 6: Step S602)

The CPU 12 determines whether one or more encrypted data blocks have been received. For example, this determination can be performed on the basis of whether the data received from the update data transmission unit 2 has reached the size of the encrypted data block. When one or more encrypted data blocks have been received, the process proceeds to S603, and when one or more encrypted data blocks have not been received, the process returns to S601 to continue to receive data.

(FIG. 6: Step S603)

The CPU 12 decrypts the received encrypted data block. The decrypted data is developed in the RAM 13 or the nonvolatile memory 15. Details of the decryption processing of this step will be described later.

(FIG. 6: Step S604)

The CPU 12 stores the encrypted data block, which has been decrypted last, in the RAM 13 or the nonvolatile memory 15 in order to use the data block for decryption of the next encrypted data block.

(FIG. 6: Step S605)

The CPU 12 determines whether one or more compressed data blocks are included in the decrypted data. For example, when the decrypted data size is less than one compressed data block, it can be determined that there is no compressed data block. When the compressed data block is not included, the process returns to S601 to continue to receive the data. When the compressed data block is included, the process proceeds to S606.

(FIG. 6: Step S606)

The CPU 12 decompresses the compressed data block.

(FIG. 6: Step S607)

The CPU 12 determines whether the decompressed data has reached the write block size of the nonvolatile memory 15. If not, the process returns to step S601 to continue to receive data. In a case where it has reached the size, the process proceeds to S608.

(FIG. 6: Steps S608 to S609)

The CPU 12 writes the decompressed data in the non-volatile memory 15 (S608). The CPU 12 stores the write completion data block information indicating that the writing of the data block is completed in the nonvolatile memory 15 (S609).

(FIG. 6: Step S609: Supplement)

The write completion data block information can also be used to check the consistency of the written data block. For example, the CPU 12 may determine whether the writing of the data block is normally completed by performing error correction processing or the like using the write completion data block information.

Figure 7:
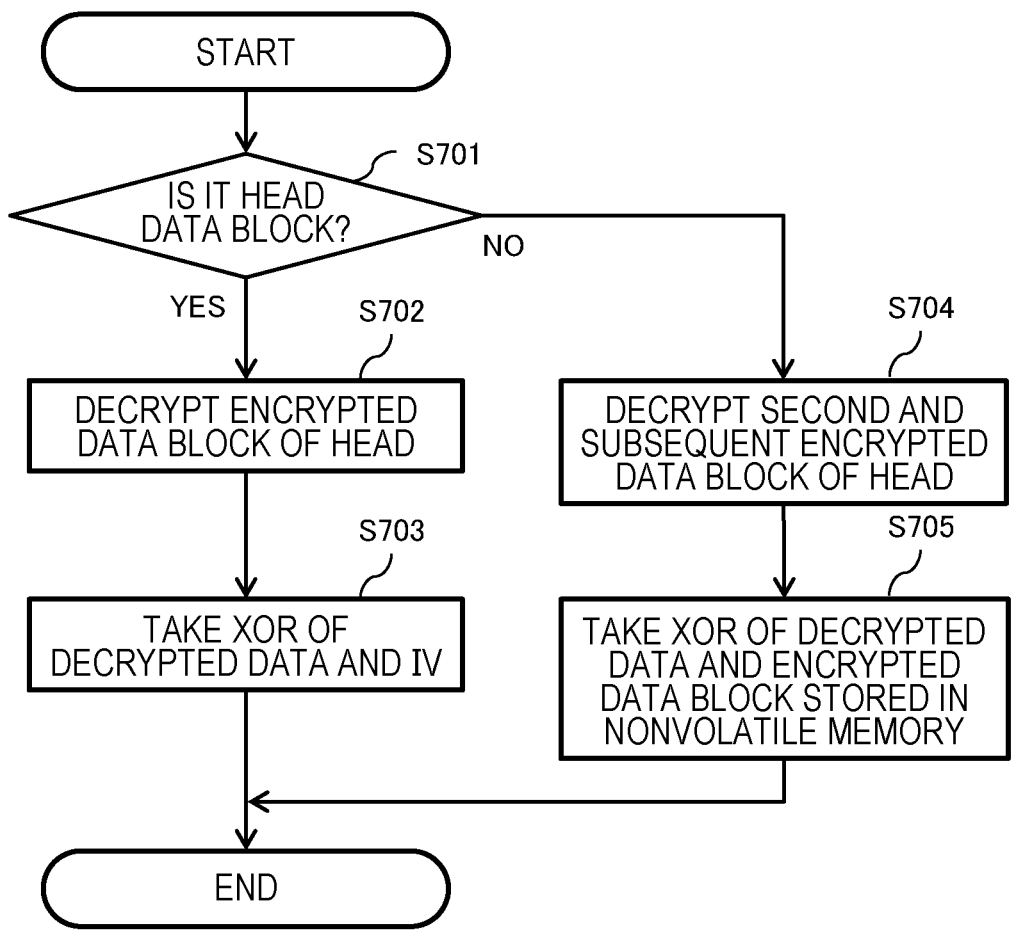
FIG. 7 is a flowchart for explaining details of S603.

FIG. 7 is a flowchart for explaining details of S603. In the present embodiment, an AES-CBC (Advanced Encryption Standard-Cipher Block Chaining) mode is used for the encryption processing and the decryption processing, but the present invention is not limited thereto, and another algorithm may be used. Hereinafter, each step of FIG. 7 will be described.

(FIG. 7: Step S701)

The CPU 12 determines whether the data block to be decrypted is the first encrypted data block (the data block 42 in the example of FIG. 2) in the update data 4. When the first encrypted data block is to be decrypted, the process proceeds to S702, and when the second and subsequent encrypted data blocks are to be decrypted, the process proceeds to S704.

(FIG. 7: Step S702)

The CPU 12 decrypts the first encrypted data block in the update data 4. For example, the same decryption key as that used in the encryption processing for generating the encrypted data block is used. The decryption key may be stored in the nonvolatile memory 15 in advance, or may be transmitted to the ECU 1 by another secure method.

(FIG. 7: Step S703)

The CPU 12 can generate a plaintext block called a plain text by taking an exclusive OR (XOR) of the decrypted encrypted data block and the IV 313 saved in the nonvolatile memory 15 in S408 of FIG. 4. S702 and S703 may be collectively regarded as decryption processing in a broad sense. The same applies to S704 and S705.

(FIG. 7: Step S704)

The CPU 12 decrypts the second and subsequent encrypted data blocks in the update data 4. The decryption key is similar to that in S702.

(FIG. 7: Step S705)

The CPU 12 can generate a plaintext block by performing XOR between the decrypted encrypted data block and the encrypted data block stored in the nonvolatile memory 15 in S604 of FIG. 6.

Second Embodiment

Figure 8:
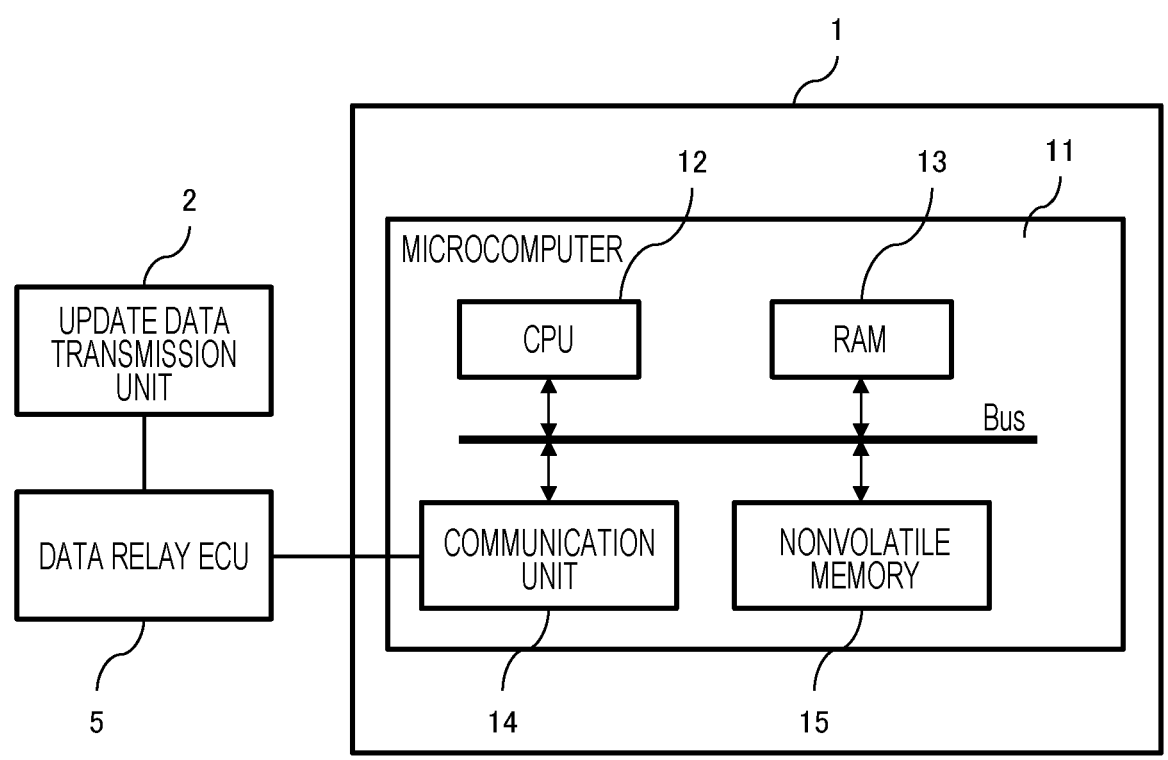
FIG. 8 is a configuration diagram of an ECU 1 according to a second embodiment.

FIG. 8 is a configuration diagram of an ECU 1 according to a second embodiment of the present invention. When the ECU 1 receives the update data 4 from the update data transmission unit 2, a data relay ECU 5 may relay the update data 4. For example, the data relay ECU 5 is a gateway device disposed between the ECU 1 and the update data transmission unit 2, and can be mounted in the same in-vehicle network as the ECU 1. When receiving the update data 4, the data relay ECU 5 temporarily stores a copy of the update data. The data relay ECU 5 does not decrypt or decompress the update data 4.

When the data relay ECU 5 can receive all the update data 4 without delay, the update data transmission unit 2 in the first embodiment is replaced with the data relay ECU 5, and the resume can be realized by the same method as in the first embodiment.

When an abnormality occurs while the data relay ECU 5 is storing the update data 4, the update data 4 may be retransmitted between the update data transmission unit 2 and the data relay ECU 5. Since the data relay ECU 5 does not decrypt or decompress the update data 4, a retransmission start address may be simply set immediately after the address range that can be stored in the data relay ECU 5.

Third Embodiment

Figure 9:
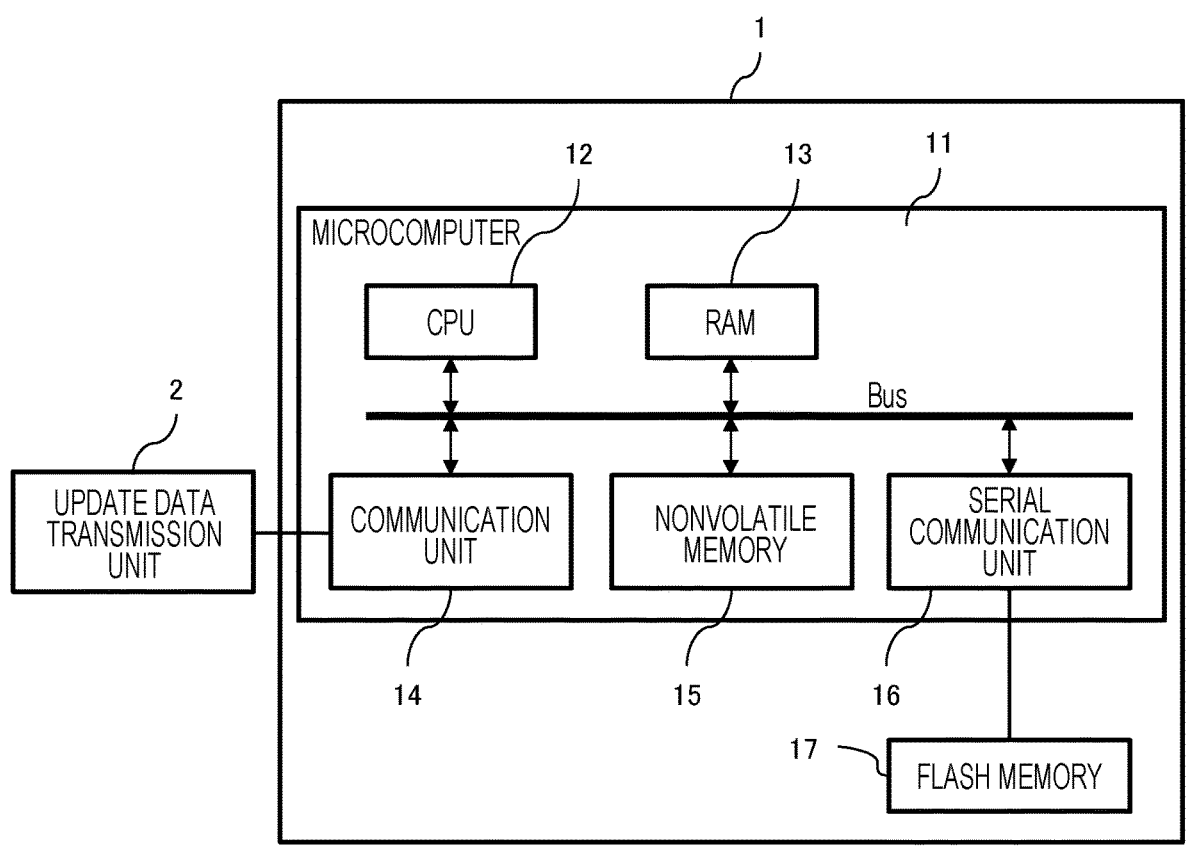
FIG. 9 is a configuration diagram of an ECU 1 according to a third embodiment.

FIG. 9 is a configuration diagram of an ECU 1 according to a third embodiment of the present invention. The update data 4 may be stored in a non-volatile storage device such as a flash memory 17 disposed outside the microcomputer 11 instead of the nonvolatile memory 15. In this case, the microcomputer 11 accesses the flash memory 17 via an interface such as a serial communication unit 16 and writes a data block obtained by decrypting and decompressing the update data 4.

Fourth Embodiment

Figure 10:
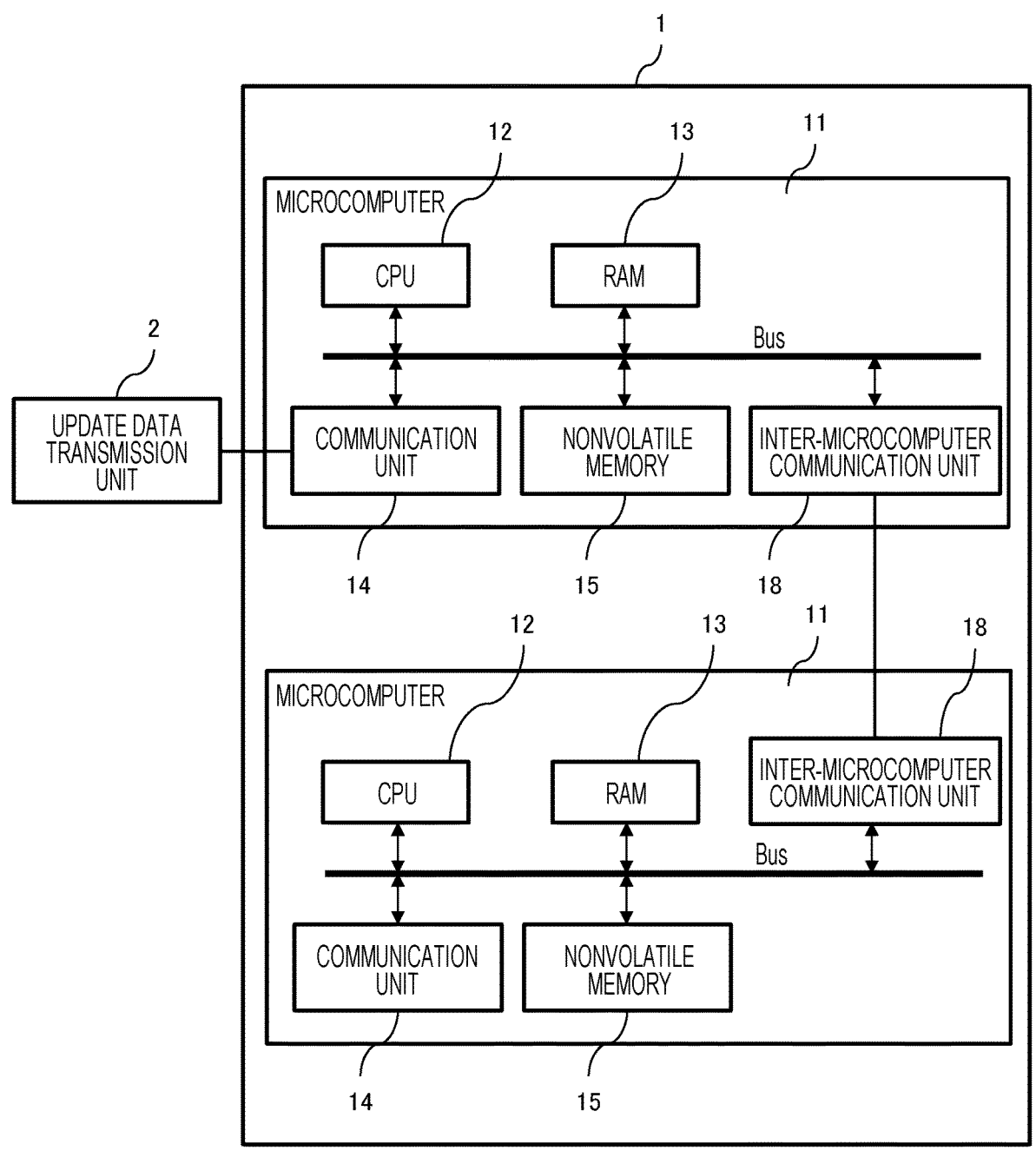
FIG. 10 is a configuration diagram of an ECU 1 according to a fourth embodiment.

FIG. 10 is a configuration diagram of an ECU 1 according to a fourth embodiment of the present invention. The present invention can also be applied to a case where the ECU 1 includes two or more microcomputers 11 as illustrated in FIG. 10. Specifically, one of the microcomputers 11 receives the update data 4. The data block obtained from the update data 4 by decompression and decryption is shared by the other microcomputers 11 via an inter-microcomputer communication unit 18.

<Conclusions>

An ECU 1 according to the present invention is an electronic control device mounted on a vehicle, the electronic control device including: a calculation unit configured to execute a program in which a process of controlling a device mounted on the vehicle; a communication unit configured to configured to receive update data used to update the program; and a storage unit configured to store the program. A first data block included in the update data is encrypted by using a second data block that is included in the update data and is different from the first data block. The calculation unit decrypts the update data by decrypting the first data block using the second data block. The calculation unit re-acquires the update data including both the first data block and the second data block and then re-decrypts the first data block using the re-acquired second data block when a write processing of writing the decrypted first data block in the storage unit is interrupted in a middle. For example, in a case where the write processing is interrupted due to cutoff of the power supply or the like, there is a possibility that decrypted data which is target data of the write processing is lost. Therefore, when the write processing is resumed, it is necessary to perform decryption processing again, and this decryption processing requires not only a block to be decoded but also another block to be used for decoding. Therefore, when the write processing is resumed, retransmission is instructed not only for the block to be subjected to the write processing but also for the block to be used for decryption. As a result, the decryption processing is appropriately performed, and the write processing can be resumed.

In such an ECU 1, the first data block may be arranged after the second data block in the update data, and the calculation unit may re-acquire the update data including both the first data block and the second data block by re-acquiring the update data from an address obtained by tracing back a difference between a start address of the first data block and a start address of the second data block when the write processing is interrupted in a middle. By using the data block immediately before the block to be decrypted as the block used for decryption, the encryption processing according to the encryption use mode can be applied.

In the ECU 1, when re-acquiring the first data block and the second data block together, the calculation unit may designate a resume address indicating a position of the first data block and then transmits a request of the re-acquisition. The calculation unit may acquire the first data block from an address corresponding to the resume address in the re-acquired update data, and acquire the second data block from an address traced back from the resume address by the difference. When the resume address of the block to be decrypted is designated, it is not necessary to designate the resume addresses of both the block to be decrypted and another block necessary for decryption by setting in advance such that another block to be used for description is also transmitted. This makes it possible to avoid complicated processing on the ECU 1 side.

In the ECU 1, the update data may be subjected to compression processing and then to the encryption. The calculation unit may acquire the first data block and the second data block from the update data by performing decompression processing after performing decryption on the update data. By performing the compression processing before the encryption processing, a higher compression effect can be obtained (compression rate is high). In addition, by performing the processing in the order of compression, encryption, data transfer, decryption, and decompression, the decryption processing and the decompression processing can be appropriately performed.

In the ECU 1, the electronic control device may further include an initialization vector storage unit that stores an initialization vector used to decrypt a data block encrypted first in the update data. The calculation unit may decrypt a data block encrypted first in the update data using the initialization vector stored in advance in the initialization vector storage unit. At the time of decryption processing, data transfer with higher security can be performed by performing encryption processing requiring an initialization vector. When the initialization vector is included in the update data, it is not necessary to have the initialization vector on the vehicle side in advance, and it is easy to change the setting such as changing the initialization vector for each specification. In a case where the initialization vector is provided on the vehicle side in advance, the transmitted initialization vector is not lost even when the reason for interrupting the write processing is as follows: the power supply is cut off.

In the ECU 1, the update data may include an initialization vector used to decrypt a data block encrypted first in the update data. The calculation unit may decrypt a data block encrypted first in the update data using the initialization vector. As a result, even when an algorithm that performs decryption using another data block is used, the first encrypted data block can be appropriately decrypted.

In the ECU 1, the initialization vector may be included in a header portion of a head of the update data. When the second data block is a data block encrypted first in the update data, the calculation unit may decrypt the second data block using the initialization vector. Since the initialization vector is included in the global header and is transmitted first when the update data is transmitted, the initialization vector can be reliably used during decryption processing of a data block that is decrypted first.

In the ECU 1, the electronic control device may further include a memory that temporarily stores the second data block used when the calculation unit decrypts the update data. The calculation unit may store the second data block in the memory in advance before decrypting the first data block. The calculation unit may re-acquire the first data block and re-acquires the second data block from the memory when the write processing is interrupted in a middle. Since another block used for decryption is stored in advance in the memory, the decryption processing may be performed by reading another block stored in the memory when the decryption processing of the block to be decrypted is performed. For example, at the time of manufacturing an electronic controller mounted on a vehicle, by storing an initialization vector in a memory in the electronic controller, the initialization vector can be used at the time of decryption processing without including the initialization vector in update data.

In the ECU 1, the update data may include the first data block next to the second data block. When a process of writing the first data block to the storage unit is interrupted in a middle after the second data block is written to the storage unit, the calculation unit resumes the process of writing the update data to the storage unit from the first data block. Since the write processing is restarted from the second data block next to the first data block for which the write processing has been completed, data transmission and writing can be minimized, and efficient write processing can be performed.

In the ECU 1, the electronic control device may further include a memory that stores write completion block information indicating that writing of the data block of the update data to the storage unit is completed. Each time a data block of the update data is written in the storage unit, the calculation unit may store the write completion block information related to the data block in which writing is completed in the memory. When the write completion block information indicates that the writing of the first data block to the storage unit is not completed, the calculation unit may resume the process of writing the update data to the storage unit from the first data block. When the write processing is resumed, it is possible to easily specify from which data block the write should be resumed by referring to the write completion information in the data flash.

In the ECU 1, the calculation unit may diagnose whether the update data is normally written to the storage unit according to the write completion block information. By performing the abnormality determination of the write processing, it is possible to perform safer write processing, that is, safe program data update processing.

In the ECU 1, the vehicle may include a gateway device that temporarily stores the update data and transfers the temporarily stored update data to the electronic control device.

The communication unit may receive the update data via the gateway device. When resuming the write processing interrupted in a middle, the calculation unit may re-acquire the update data temporarily held by the gateway device. After the update data is temporarily stored in the gateway, communication between the update data transmission unit 2 and the vehicle becomes unnecessary, so that the update processing of the program data can be performed regardless of the communication state. In addition, since the update data stored in the gateway is used when the write processing is resumed, there is no need to perform communication between the electronic terminal and the vehicle again.

In the ECU 1, the update data may include an initialization vector used to decrypt a data block encrypted first in the update data. When the second data block is a data block encrypted first in the update data, the calculation unit may acquire the second data block and the initialization vector together to decrypt the second data block. When the first encrypted block is written, the decryption processing can be appropriately performed by transmitting an initialization vector necessary for the decryption processing performed before the write processing.

In the ECU 1, the update data may include an initialization vector used to decrypt a data block encrypted first in the update data. The first data block may be arranged after the second data block in the update data. When decrypting the first data block, the calculation unit may decrypt the first data block by acquiring the first data block and the second data block together. In a case where the second and subsequent encrypted blocks are written, another block is required at the time of the decryption processing, and thus the decryption processing can be appropriately performed by transmitting this block together.

<Modifications of Present Invention>

The present invention is not limited to the above embodiments, but various modifications may be contained. For example, the above-described embodiments of the present invention have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

In the above embodiment, data to be written to the nonvolatile memory 15 or the flash memory 17 may be kept compressed. In this case, when the CPU 12 uses the compressed data, the compressed data may be dynamically decompressed and temporarily stored in the RAM 13, and the decompressed data may be read from the RAM 13 and executed.

In the fourth embodiment, the microcomputer 11 that has received the update data 4 first may decrypt the update data 4 and then transmit the decrypted data to the other microcomputer 11, or each microcomputer 11 may transmit the update data 4 as it is to the other microcomputer 11 and decrypt the update data 4 by itself.

REFERENCE SIGNS LIST

1 ECU
11 microcomputer
12 CPU
13 RAM
14 communication unit
15 nonvolatile memory
16 serial communication unit
17 flash memory
18 inter-microcomputer communication unit
2 update data transmission unit
3 update data
31 global header
321 to 3N1 local header
322 to 3N2 body
4 update data
42 to 4N encrypted data block
5 data relay ECU

The invention claimed is:

1. An electronic control device mounted on a vehicle, the electronic control device comprising:
   a storage unit that stores a program for controlling the electronic control device mounted on the vehicle, and
   one or more processors configured to:
   receive update data used to update the program including a first data block, where the first data block is encrypted by using a second data block that is included before the first data block in the update data and is different from the first data block,
   decrypt the update data by decrypting the first data block using the second data block, and when write processing of writing the decrypted first data block in the storage unit is interrupted in a middle:
      re-acquire the update data including the first data block based on a first start address,
      re-acquire the update data including the second data block based on a second start address determined from tracing back a difference between the first start address of the first data block and the second start address of the second data block, and
      re-decrypt the first data block using the re-acquired second data block.

2. The electronic control device according to claim 1, wherein the one or more processors are further configured to:
   when re-acquiring the first data block and the second data block together, designate a resume address indicating a position of the first data block and then transmits a request of the re-acquisition, and
   acquire the first data block from an address corresponding to the resume address in the re-acquired update data, and acquires the second data block from an address traced back from the resume address by the difference.

3. The electronic control device according to claim 1, wherein the update data is subjected to compression processing and then to the encryption, and the one or more processors are further configured to:
   acquire the first data block and the second data block from the update data by performing decompression processing after performing decryption on the update data.

4. The electronic control device according to claim 1, wherein the electronic control device further includes an initialization vector storage unit that stores an initialization vector used to decrypt a data block encrypted first in the update data, and the one or more processors are further configured to:
   decrypt a data block encrypted first in the update data using the initialization vector stored in advance in the initialization vector storage unit.

5. The electronic control device according to claim 1, wherein
   the update data includes an initialization vector used to decrypt a data block encrypted first in the update data, and the one or more processors are further configured to:
   decrypt a data block encrypted first in the update data using the initialization vector.

6. The electronic control device according to claim 5, wherein the initialization vector is included in a header portion of a head of the update data, and the one or more processors are further configured to:

when the second data block is a data block encrypted first in the update data, decrypt the second data block using the initialization vector.

7. The electronic control device according to claim 1, wherein the electronic control device further includes a memory that temporarily stores the second data block used to decrypt the update data, the one or more processors are further configured to:

store the second data block in the memory in advance before decrypting the first data block, and re-acquire the first data block and re-acquire the second data block from the memory when the write processing is interrupted in a middle.

8. The electronic control device according to claim 1, wherein the update data includes the first data block next to the second data block, and the one or more processors are further configured to:

when a process of writing the first data block to the storage unit is interrupted in a middle after the second data block is written to the storage unit, resume the process of writing the update data to the storage unit from the first data block.

9. The electronic control device according to claim 8, further comprising a memory that stores write completion block information indicating that writing of the data block of the update data to the storage unit is completed, and wherein the one or more processors are further configured to:

store the write completion block information related to the data block in which writing is completed in the memory each time a data block of the update data is written in the storage unit, and when the write completion block information indicates that the writing of the first data block to the storage unit is not completed, resume the process of writing the update data to the storage unit from the first data block.

10. The electronic control device according to claim 9, wherein the one or more processors are further configured to:

diagnose whether the update data is normally written to the storage unit according to the write completion block information.

11. The electronic control device according to claim 1, wherein the vehicle includes a gateway device that temporarily stores the update data and transfers the temporarily stored update data to the electronic control device, and the one or more processors are further configured to:

receive the update data via the gateway device, and when resuming the write processing interrupted in a middle, reacquire the update data temporarily held by the gateway device.

12. The electronic control device according to claim 1, wherein the update data includes an initialization vector used to decrypt a data block encrypted first in the update data, and the one or more processors are further configured to:

when the second data block is a data block encrypted first in the update data, acquire the second data block and the initialization vector together to decrypt the second data block.

13. The electronic control device according to claim 1, wherein the first data block is arranged after the second data block in the update data, the update data includes an initialization vector used to decrypt a data block encrypted first in the update data, and the one or more processors are further configured to:

decrypt the first data block by acquiring the first data block and the second data block together.

\* \* \* \* \*